United States Patent [19]
Morel et al.

[11] Patent Number: 4,712,285
[45] Date of Patent: Dec. 15, 1987

[54] METHOD FOR ACHIEVING FLUID-TIGHTNESS OF A PLASTIC SLEEVE FOR PROTECTING SPLICES OF ELECTRIC CABLES OR TELEPHONE CABLES

[75] Inventors: Jacques Morel, Le Moulin du Roi; Didier Morel, Favières, both of France

[73] Assignee: Etablissements Morel - Ateliers Electromecaniques de Favieres, Chateauneuf en Thymerais, France

[21] Appl. No.: 838,598

[22] Filed: Mar. 11, 1986

[51] Int. Cl.$^4$ ............................................. B21D 39/02
[52] U.S. Cl. ........................................ 29/458; 29/463; 29/526 R; 29/870; 174/21 R; 174/92; 277/1
[58] Field of Search ................... 174/91, 92, 93, 21 R; 156/49; 29/463, 526 R, 870; 277/1

[56] References Cited

U.S. PATENT DOCUMENTS

| | | | |
|---|---|---|---|
| 2,139,125 | 12/1938 | Hixon | 174/91 |
| 2,775,469 | 12/1956 | Brown et al. | 29/463 |
| 2,787,051 | 4/1957 | Risley | 29/463 |
| 3,757,031 | 9/1973 | Izraeli | 174/138 F |
| 3,836,694 | 9/1974 | Kapell | 174/92 X |
| 3,992,569 | 11/1976 | Hankins et al. | 174/21 R |
| 4,387,268 | 6/1983 | Morel et al. | 174/92 |
| 4,486,620 | 12/1984 | Ball et al. | 174/93 X |
| 4,492,816 | 1/1985 | Morel et al. | 174/92 |

FOREIGN PATENT DOCUMENTS

| | | | |
|---|---|---|---|
| 0098765 | 1/1984 | European Pat. Off. | |
| 1440082 | 2/1969 | Fed. Rep. of Germany | 174/92 |
| 2203064 | 8/1973 | Fed. Rep. of Germany | 174/92 |
| 2304852 | 8/1974 | Fed. Rep. of Germany | 174/92 |
| 2630411 | 1/1978 | Fed. Rep. of Germany | |
| 2397733 | 2/1979 | France | |
| 2469782 | 11/1979 | France | |
| 2479545 | 3/1980 | France | |
| 2492151 | 10/1980 | France | |
| 7508247 | 8/1975 | Netherlands | 174/92 |

*Primary Examiner*—Morris H. Nimmo
*Attorney, Agent, or Firm*—Young & Thompson

[57] ABSTRACT

A plastic sleeve for protecting splices of telephone cables and electric cables against moisture comprises two half-shells (1a, 1b) assembled together. The edge (2a) of one half-shell (1a) comprises a rib (12) engaged in a groove (13) formed in the edge (2b) of the other half-shell (1b). One side of the groove (13) is formed by a flexible wall (14). The rib (12) which is engaged in the groove has an inclined face (12a) which forms an angle (a) of a few degrees with the inclined inner face (14a) of the flexible wall (14). The space formed by this angle is filled with a strip of putty (16) which is deformed and compressed between the inclined faces (12a and 14a).

2 Claims, 5 Drawing Figures

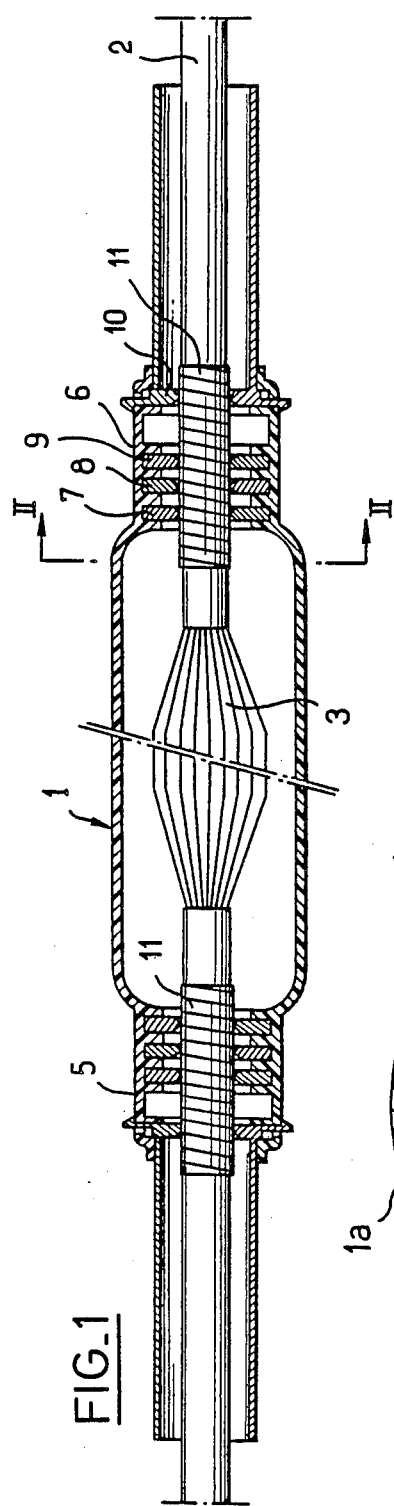
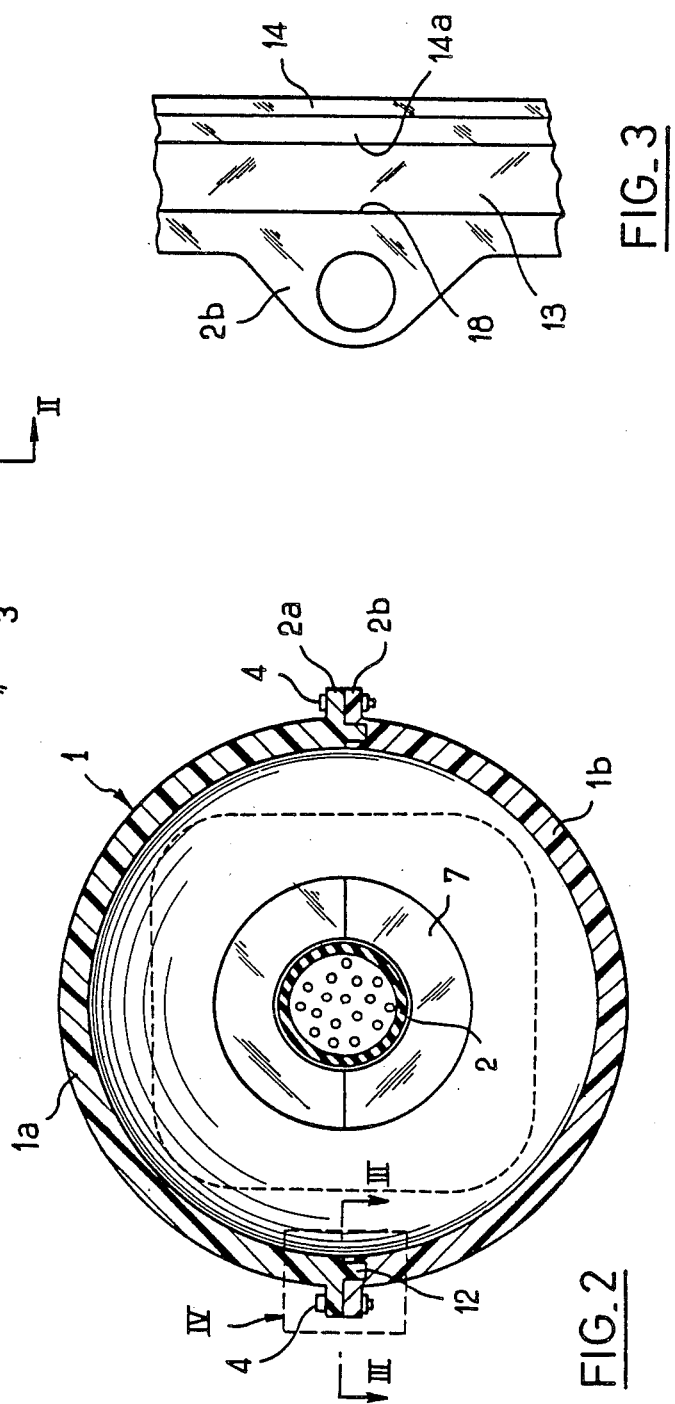

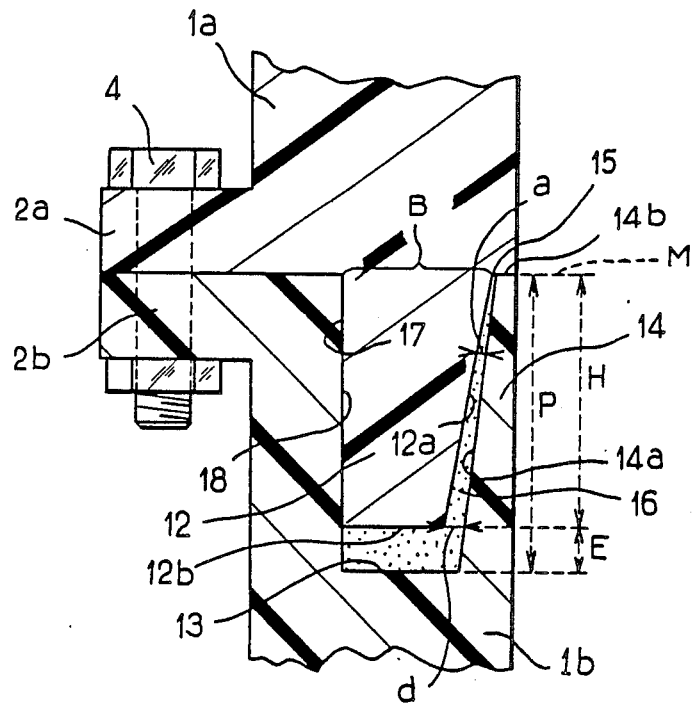
FIG._4
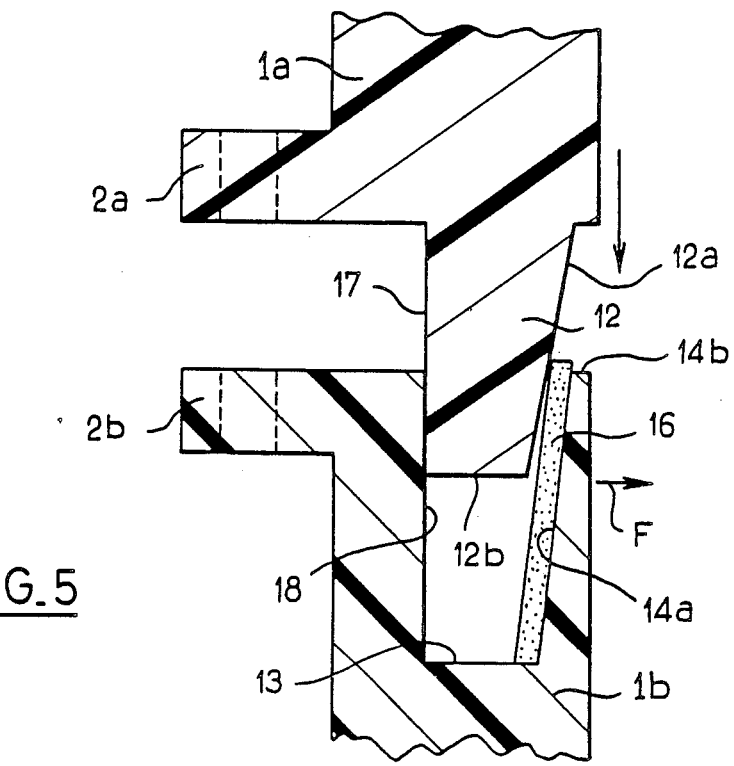
FIG._5

4,712,285

METHOD FOR ACHIEVING FLUID-TIGHTNESS OF A PLASTIC SLEEVE FOR PROTECTING SPLICES OF ELECTRIC CABLES OR TELEPHONE CABLES

BACKGROUND OF THE INVENTION

1. Field of the Invention

The present invention relates to a sleeve of plastic material for protecting splices of electric cables or telephone cables.

The invention is also directed to a method for achieving fluid-tightness of a sleeve of this type.

2. Description of the Prior Art

French Pat. No. 2,469,782 and the Certificates of Addition Nos. 2,479,545, 2,492,151, and U.S. Pat. No. 4,492,816 related to the patent aforesaid and filed by the present Applicant all describe a sleeve for protecting splices of cables and especially telephone cables, said sleeves being constituted by two half-shells assembled together along their adjacent edges. In the assembly position, said adjacent edges define between them a peripheral channel into which a sealing product in paste form is introduced by injection, for example.

At the opposite ends of the sleeve, the cable is clamped between a series of jaws which are removably fitted within the sleeve.

In the French patent and the Certificates of Addition cited earlier, the present Applicant described different means for obtaining excellent fluid-tightness between the adjacent edges of the two half-shells of the sleeve and also between the cable and the clamping jaws which are fitted in the end portions of said sleeve.

Although the solutions described in the aforementioned patent and certificates of Addition are all satisfactory, they call for equipment which is complicated to use such as cartridges for the injection of sealing material into the peripheral channel defined between the adjacent edges of the pre-assembled half-shells.

The aim of the present invention is therefore to produce a cable protection sleeve which makes it possible to obtain excellent fluid-tightness between the adjacent edges of the half-shells of said sleeve, the means employed for the achievement of this result being both inexpensive and simple to use.

SUMMARY OF THE INVENTION

The protective sleeve contemplated by the invention comprises two half-shells assembled together along their adjacent edges, the edge of one of the half-shells being provided with a longitudinal rib engaged within a groove formed in the adjacent edge of the other half-shell and sealing means being provided between said edges.

In accordance with the invention, said sleeve is distinguished by the fact that the groove has an inner side wall of sufficiently small thickness to be flexible, that the height of the rib which is engaged in said groove is slightly less than the depth of the groove, that the rib face which is adjacent to the inner face of said flexible wall forms with said inner face an angle of a few degrees having a vertex located at the extremity of said wall, the space defined by said angle being filled by a strip of putty which is deformed and compressed between said faces of the rib and of the wall.

In accordance with the method contemplated by the invention, in order to form a tight seal between the two half-shells of the protective sleeve aforesaid, a strip of putty is applied against the inner face of the flexible wall which extends on one side of the groove of one of the two half-shells, the rib of the other half-shell is engaged in the groove, the two half-shells are tightly applied against each other, whereupon the interior of the sleeve is put under pressure.

By virtue of the angle of a few degrees formed between the adjacent faces of the rib and of the flexible wall, when said rib is engaged within the groove, the strip of putty is accordingly compressed between these two faces and is progressively deformed by creepage flow. Compression of the putty between these two faces tends to cause the flexible wall to bend towards the interior of the sleeve.

When the half-shells have been assembled together in interengaged relation, the pressure which is applied within the sleeve by means of clamping screws, for example, tends to thrust the flexible wall towards the rib, which has the effect of compressing the putty and thus increasing the tightness of the seal. By virtue of the wedge formed between the adjacent faces of the flexible wall and of the rib under the action of compression, the putty tends to creep more readily towards the space formed between the summit of the rib and the bottom of the groove and thus to produce a favorable effect in regard to fluid-tightness but does not tend to creep towards the summit of the flexible wall and towards the interior of the sleeve.

BRIEF DESCRIPTION OF THE DRAWINGS

Other features of the invention will be more apparent to those skilled in the art upon consideration of the following description and accompanying drawings, wherein:

FIG. 1 is a longitudinal sectional view of a sleeve in accordance with the invention, said sleeve being mounted around the splice of a telephone cable;

FIG. 2 is a sectional view to a larger scale and taken along the plane II—II of FIG. 1;

FIG. 3 is a sectional view to an even larger scale and taken along the plane III—III of FIG. 2, it being assumed that the upper half-shell has been removed;

FIG. 4 is a large-scale view showing the detail IV of FIG. 2;

FIG. 5 is a view which is similar to FIG. 4, which shows the half-shells in a partially interengaged position, and which illustrates the practical application of the method in accordance with the invention.

DETAILED DESCRIPTION OF THE INVENTION

In the embodiment of FIGS. 1 and 2, the plastic sleeve 1 which is mounted around the splice 3 of the telephone cable 2 comprises two half-shells 1a, 1b (as shown in FIG. 2), said half-shells being assembled one against the other along their adjacent edges 2a, 2b by means of clamping screws 4.

The cable 2 is secured axially to the end portions 5, 6 of the sleeve by means of a series of jaws 7, 8, 9, 10 fitted within the sleeve 1 and tightly applied against an adhesive tape 11 having a base of elastomer and wound around the cable 2.

FIG. 4 shows in greater detail that the edge 2a of the half-shell 1a comprises a longitudinal rib 12 engaged in a groove 13 which is formed in the adjacent edge 2b of the other half-shell 1b (as also shown in FIG. 3).

The thickness of the inner wall 14 of the groove 13 is sufficiently small to ensure flexibility of said wall.

As indicated in FIG. 4, the rib 12 which is engaged within the groove 13 has a height H which is slightly smaller than the depth P of the groove. Moreover, the face 12a of the rib 12 which is adjacent to the inner face 14a of the wall 14 forms with said inner face an angle (a) of a few degrees (2 to 5 degrees, for example), the vertex 15 of which is located at the extremity 14b of the wall 14. The space defined by said angle (a) is filled with a strip of putty 16 which is deformed and compressed between the face 12a of the rib 12 and the face 14a of the wall 14.

The space E located between the summit 12b of the rib 12 and the bottom of the groove 13 is filled with the material produced by creepage flow of the strip of putty 16 which is compressed between the faces 12a and 14a.

As can also be seen in FIG. 4, the wall 14, the groove 13 and the rib 12 have a trapezoidal cross-section and the large base B of the trapezoidal cross-section of the groove 13 coincides with that of the rib 12 which is engaged within this latter.

In addition, the faces 17 and 18 of the rib 12 and of the groove 13 which are opposite to the flexible wall 14 are applied against each other and are substantially perpendicular to the plane of assembly M of the two half-shells 1a, 1b.

In accordance with the invention, in order to form a tight seal between the two half-shells 1a, 1b of the sleeve 1 described in the foregoing, the procedure is as follows (see FIG. 5):

A strip of putty 16 is applied against the inner face 14a of the flexible wall 14 which extends on one side of the groove 13 of the half-shell 1b, the rib 12 of the other half-shell 1a is engaged in the groove 13, the two half-shells 1a and 1b are tightly applied against each other by means of screws 4, whereupon the interior of the sleeve 1 is put under pressure. The internal pressure of said sleeve can be of the order of a few bar.

The thickness of the strip 16 of putty is at least equal to the distance d between the summit 12b of the rib 12 and the inner face 14a of the flexible wall 14 when said rib is fully engaged in the groove.

Preferably, the volume of the strip 16 of putty is at least equal to the volume of the space formed between the adjacent faces 12a, 14a of the rib 12 and of the flexible wall 14 and between the summit 12b of the rib 12 and the bottom of the groove 13.

At the time of assembly of the half-shells 1a, 1b of the sleeve in accordance with the invention, the rib 12 of the half-shell 1a engages in the groove 13 of the half-shell 1b as indicated in FIG. 5. During this engagement, the strip of putty 16, the volume of which is initially greater than that of the available space between the wedge formed by the two opposite faces 12a and 14a, is progressively deformed and compressed in a downward movement of creepage flow, with the result that the excess putty fills the space E. This compression of the putty 16 has the effect of thrusting the rib 12a against the face 18 of the groove 13 and of subjecting the flexible wall 14 to a light outward thrust (as shown by the arrow F in FIG. 5).

After clamping by means of the screws 4, the putty 16 is trapped and compressed within the space located between the two faces 12a and 14a and between the summit 12b of the rib and the bottom of the groove 13.

After pressurization of the interior of the sleeve, no outleakage is found to occur.

This internal pressure guards against any danger of penetration of moisture into the sleeve. Moreover, said internal pressure has the effect of thrusting the flexible wall 14 in a direction opposite to the arrow F of FIG. 5 and of compressing the putty 16 to an even greater extent, thus achieving enhanced fluid-tightness and removing any risk of creepage flow of putty at the level of the junction between the summit 14b of the flexible wall and the base of the rib 12.

The strip of putty 16 can be applied by hand on the face 14a of the wall 14. Preferably, however, said strip 16 is extruded directly and automatically onto the face 14a of the wall 14 by means of a suitable extruder.

The putty 16 can have an elastomer base of a type commonly employed in sealing operations. The putty must be sufficiently soft to enable it to assume the wedge shape defined between the surfaces 12a and 14a while at the same time ensuring that such deformation is not liable to exert an unduly high pressure on the flexible wall 14 since this would in turn be liable to subject the wall to excessive flexural deformation in the outward direction. There thus exists a certain correlation between deformability of the putty 16 and flexibility of the wall 14, this correlation being determined by experience.

As will readily be apparent, the invention is not limited to the examples described in the foregoing and any number of modifications may accordingly be contemplated without thereby departing either from the scope or the spirit of the invention.

What is claimed is:

1. A method for forming a tight seal between two half-shells (1a, 1b) to be assembled together along their adjacent edges (2a, 2b) according to a plane of assembly (M), comprising providing two half-shells (1a, 1b), the edge (2a) of one half-shell (1a) being provided with a longitudinal rib (12) to be engaged within a groove (13) formed in the edge (2b) of the other half-shell (1b), said groove (13) having an inner side wall (14) of sufficiently small thickness to be flexible, the height (H) of the rib (12) to be engaged in said groove being slightly smaller than the depth (P) of the groove, the rib (12) having a face (12a) adjacent to the interior of said one half-shell (1a), the inner face (14a) of said flexible wall (14) forming with said inner face, when said rib is engaged into said groove, an angle (a) of a few degrees having a vertex (15) located at the extremity of said wall, the faces (17, 18) of the rib (12) and of the groove (13) which are opposite to the flexible wall (14) being applied against each other substantially perpendicular to the plane of assembly (M) of the two half-shells (1a, 1b), said method comprising the steps consisting in:
    applying a flat strip of putty (16) against the inner face (14a) of the flexible wall (14) of said other half-shell (1b), the thickness of the strip of putty (16) being at least equal to the distance (d) between the summit (12b) and the rib (12) and the inner face (14a) of the flexible wall (14) when said rib is fully engaged in the groove,
    engaging the rib (12) into the groove (13),
    applying the two half-shells (1a, 1b) tightly against each other along the plane of assembly (M) and,
    putting under pressure the interior of the sleeve formed by said assembled two half-shells.

2. A method according to claim 1, wherein the volume of the strip of putty (16) is at least equal to the volume of the space located between the adjacent faces (12a, 14a) of the rib (12) and of the flexible wall (14) and between the summit (12b) of the rib and the bottom of the groove (13).

* * * * *